US008526054B2

(12) United States Patent
Krucinski

(10) Patent No.: US 8,526,054 B2
(45) Date of Patent: Sep. 3, 2013

(54) DYNAMIC IMAGE REGISTRATION APPARATUS AND METHOD

(75) Inventor: Martin Krucinski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1153 days.

(21) Appl. No.: 12/430,677

(22) Filed: Apr. 27, 2009

(65) Prior Publication Data

US 2010/0272487 A1 Oct. 28, 2010

(51) Int. Cl.
*G06K 15/02* (2006.01)

(52) U.S. Cl.
USPC ........................................... 358/1.5; 399/395

(58) Field of Classification Search
USPC .......................... 358/1.5, 1.1, 1.14; 399/395
See application file for complete search history.

(56) References Cited

U.S. PATENT DOCUMENTS

| | | | | |
|---|---|---|---|---|
| 6,137,517 | A * | 10/2000 | Furst et al. | 347/116 |
| 6,628,909 | B2 | 9/2003 | Monahan et al. | |
| 6,718,879 | B2 | 4/2004 | Dreher et al. | |
| 6,871,037 | B1 | 3/2005 | Pierel et al. | |
| 7,177,585 | B2 * | 2/2007 | Matsuzaka et al. | 399/394 |
| 2001/0043823 | A1 | 11/2001 | Metzler et al. | |
| 2006/0045577 | A1 * | 3/2006 | Maeda | 399/301 |

* cited by examiner

*Primary Examiner* — King Poon
*Assistant Examiner* — Iriana Cruz
(74) *Attorney, Agent, or Firm* — Hoffmann & Baron, LLP

(57) ABSTRACT

According to aspects described herein, there is disclosed an apparatus and method for dynamically registering an image relative to a target substrate media in a printing system. The apparatus and method including a marking engine, transport, sensing system and a correction module. The marking engine for generating the image for transfer to the target substrate media. The transport for moving the target substrate media along the path in the process direction to receive the image in a transfer area from the marking engine. The sensing system for detecting a characteristic of at least one other substrate media moved previously by the transport. Also, the correction module for altering the image generated by the marking engine based on at least one signal from the sensing system. The characteristic of the at least one other substrate media being detected from at least two portions of the path, the two portions disposed on opposed sides of the transfer area in the process direction.

16 Claims, 3 Drawing Sheets

DYNAMIC IMAGE REGISTRATION APPARATUS AND METHOD

INCORPORATION BY REFERENCE

The following US patent application is incorporated in its entirety for the teachings therein: USPTO Ser. No. 12/364,675, filed Feb. 3, 2009, entitled Modular Color Xerographic Printing Apparatus, assigned to the assignee hereof.

TECHNICAL FIELD

The presently disclosed technologies are directed to controlling and/or adjusting the position of an image in a printing system. In particular, it is directed to a method and system for dynamic image registration.

BACKGROUND

In general, conventional image forming apparatus such as copiers and laser printers employing an electrophotographic system or electrostatic recording system have a configuration in which image exposure is performed on a surface of a photosensitive drum to form an electrostatic latent image; the electrostatic latent image formed on the surface of the photosensitive drum is developed by a developing device to form a toner image in a predetermined color, and the toner image is directly transferred on to and fixed on a sheet of recording paper, a sheet of other substrate media or temporarily transferred to an intermediate transfer body and is thereafter transferred on to the recording paper at a time to form an image. The area where the photoreceptor engages and/or interacts with the belt or sheet is referred to as the transfer area. Transfer of the image to the sheet or transfer body should be in precise registration, otherwise it can cause processing interruptions or delays and/or impair the print quality.

In the case of a full-color printing apparatus, there are typically four development units; cyan, magenta, yellow, and black (CMYK). In a "highlight color" printing apparatus, where it desired to print black plus one other predetermined color, a typical arrangement is to have a black development unit and one or more development units, one for each of a selectable set of highlight colors, only one of which would be used at a time. Other types of architecture include "hexachrome," where there are two additional color development units beyond CMYK, thus providing an extended color gamut for the printer; and arrangements that include a development unit for applying clear toner, or one applying a toner with special properties such as MICR (magnetic ink character recognition) toner.

Examples of typical basic color xerographic architectures are shown in U.S. Pat. Nos. 6,628,909; 7,177,585; and 6,871,037. Variously, the development units could be arranged around a single photoreceptor belt; each development unit could be associated with a single drum photoreceptor, and the drum photoreceptors arranged around a common "intermediate belt" that accumulates the primary-color toner images for transfer to a print sheet; or the drum photoreceptors could each directly transfer their primary-color images to a sheet moving past each photoreceptor. U.S. Pat. No. 6,718,879 and U.S. Patent Application Publication 20010043823 show examples of control systems useful for accurate placement of images in a large color printer.

Contemporary systems assume a constant and smooth motion of the sheet as it travels through the transfer area. Thus, it is assumed that the orientation and lateral position of the sheet as delivered into the transfer area and tacked to the photoreceptor drum or belt remains the same exiting the transfer area. In fact, in order to ensure a constant and smooth transition, many systems release sheet nip assemblies upstream from the transfer area, as soon as the sheet leading edge tacks. Such a nip release can minimize any forces and velocity vibrations from affecting the sheet motion in the transfer area. Additionally, post-transfer transports are designed in a way to minimize the forces and torques on the sheet as its leading edge is acquired after image transfer and the sheet is transported to a fuser. However, particularly in modular print assemblies, sheet transfer between modules can accumulate sheet velocity vector errors. The accumulation of these velocity vector errors can impart large push/pull forces on the sheet. With medium or light-weight substrate media such forces can cause wrinkling, buckling and/or tearing of the sheet. Further, in modular overprint systems where each module prints over a previous module, the push/pull forces can lead to large Image-on-Paper registration and color-to-color registration errors.

Accordingly, it would be desirable to provide a method and system of dynamically registering an image relative to the recording paper, other substrate media or intermediate transfer body in a printing system in order to avoid processing interruptions or delays, poor quality image registration and other shortcomings of the prior art.

SUMMARY

According to aspects described herein, there is disclosed an apparatus and method for dynamically registering an image relative to a target substrate media in a printing system. The apparatus including a marking engine, transport, sensing system and a correction module. The marking engine for generating the image for transfer to the target substrate media. The transport for moving the target substrate media along the path in the process direction to receive the image in a transfer area from the marking engine. The sensing system for detecting a characteristic of at least one other substrate media moved previously by the transport. Also, the correction module for altering the image generated by the marking engine based on at least one signal from the sensing system. The characteristic of the at least one other substrate media being detected from at least two portions of the path, the two portions disposed on opposed sides of the transfer area in the process direction.

According to other aspects described herein, the at least one signal can indicate at least one of a process direction movement, a cross-process direction movement and a skew of the at least one other substrate media relative to the path. The characteristic of the at least one other substrate media can be detected directly by sensing the substrate media and/or indirectly by sensing at least a portion of the transport. Also, the altered image can correspond to a shift of the at least one other substrate media in at least one of a process direction, a cross process direction and a skew. Additionally, the sensing system can include at least one sensor disposed on each of the opposed sides of the transfer area. Further, the sensing system can also include at least one of a belt edge sensor, a sheet edge sensor, a point sensor and an array sensor for detecting an edge of the at least one other substrate media. The at least one other substrate media can include a plurality of other substrate media. The correction module can alter the image generated based on at least one of a dimension of the target substrate media, a spacing between a plurality of the other substrate media, and the presence of at least one other substrate media ahead of and/or behind the target substrate media in the process direction. The printing apparatus can further include a supply of marking material, wherein the image generated by the marking engine is formed of marking material. The marking engine can include an electrostatographic image receptor, wherein the image receptor engages the substrate media in the transfer area to transfer a marking material. Also, the correction module can cause the marking engine to change magnification of the image generated by the correction module.

According to other aspects described herein, there is disclosed a method of dynamically registering an image relative to a target substrate media in a printing system. The target substrate media moves substantially in a process direction within the printing system along a path. The method includes detecting a characteristic of at least one trial substrate media crossing a transfer area of a marking engine in the printing system. The characteristic are detected from opposed sides of the transfer area relative to the process direction. The method also includes shifting an image generated by the marking engine based on the detected characteristic. Also, the method includes transferring the shifted image to a target substrate media.

According to other aspects described herein, the detected characteristic can indicate at least one of a process direction movement, a cross-process direction movement and a skew of the at least one trail substrate media relative to the path. Also, the shifted image can correspond to a shift of the at least one trial substrate media in at least one of a process direction, a cross process direction and a skew. Additionally, the characteristic can be detected by a sensing system that includes at least one of a belt edge sensor, a sheet edge sensor, a point sensor and an array sensor for detecting an edge of the at least one trial substrate media. The at least one trial substrate media can include a plurality of trial substrate media. Also, the image can be shifted by a correction module that alters the image generated based on at least one of a dimension of the target substrate media, a spacing between a plurality of the other substrate media, and the presence of at least one other substrate media at least one of ahead of or behind the target substrate media in the process direction. Additionally, the correction module can cause the marking engine to change magnification of the image generated by the correction module. Further, the marking engine can include an electrostatographic image receptor, the image receptor engaging the substrate media in the transfer area to transfer a marking material.

DETAILED DESCRIPTION

Figure 1:
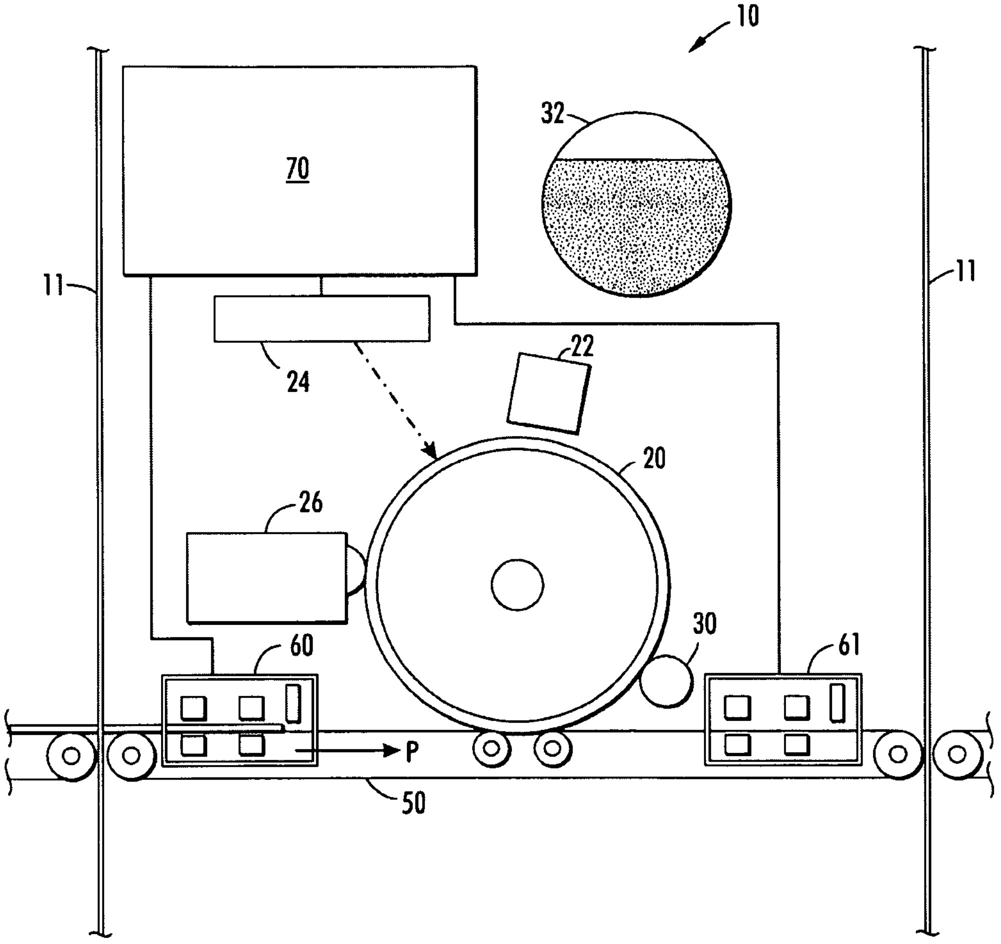
FIG. 1 is a schematic elevation view of a dynamic image registration apparatus in accordance with aspects of the disclosed technologies.

Describing now in further detail these exemplary embodiments with reference to the Figures. A dynamic image registration apparatus and method is disclosed for more accurately placing an image on substrate media or an intermediate transfer body in a printing system. Thus, a portion of an exemplary printing system is illustrated herein, as well as a modular assembly of printing systems.

As used herein, a “printer” or “printing system” refers to one or more devices used to generate “printouts” or a print outputting function, which refers to the reproduction of information on “substrate media” for any purpose. A “printer” or “printing system” as used herein encompasses any apparatus or portion thereof, such as a digital and/or analog copier, bookmaking machine, facsimile machine, multi-function machine, etc. which performs a print outputting function.

A printing system can use an “electrostatographic process” to generate printouts, which refers to forming and using electrostatic charged patterns to record and reproduce information, a “xerographic process”, which refers to the use of a resinous powder, such as toner, on an electrically charged plate, roller or belt and reproduce information, or other suitable processes for generating printouts, such as an ink jet process, a liquid ink process, a solid ink process, and the like. Also, such a printing system can print and/or handle either monochrome or color image data.

As used herein, “substrate media” refers to, for example, paper, transparencies, parchment, film, fabric, plastic, or other substrates on which information can be reproduced, preferably in the form of a sheet or web. A “target substrate media” refers to one or more particular substrate media intended to receive a transferred image. A “trial substrate media” refers to one or more preliminary sheets of substrate media passed through the printing system, or at least the transfer area of a printing system, prior to the target substrate media.

As used herein, the term “belt” or “transfer belt” refers to, for example, an elongated flexible web supported for movement along a process flow direction. For example, an image transfer belt is capable of conveying an image in the form of toner for transfer to a substrate media. Another example includes a media transfer belt, which preferably engages and/or carries a substrate media within a printing system. Such belts can be endless belts, looping around on themselves within the printing system in order to continuously operate. Accordingly, belts move in a process direction around a loop in which they circulate. A belt can engage a substrate media and/or carry an image thereon over at least a portion of the loop. Image transfer belts for carrying an image or portions thereof can include non-stretchable electrostatic or photoreceptor belts capable of accumulating toner thereon.

As used herein, “sensor” refers to a device that responds to a physical stimulus and transmits a resulting impulse for the measurement and/or operation of controls. Such sensors include those that use pressure, light, motion, heat, sound and magnetism. Also, each of such sensors as referred to herein can include one or more point sensors and/or array sensors for detecting and/or measuring characteristics of a belt, image or substrate media, such as speed, orientation, process or cross-process position, size or even thickness. Thus, reference herein to a “sensor” can include more than one sensor.

As used herein, the term “process direction” refer to a direction along a path associated with a process of printing or reproducing information on substrate media. The process direction is a flow path in which a belt moves as part of the system in order to convey an image and/or a substrate media from one location to another within the printing system. A “cross-process direction” is generally perpendicular to the process direction. Also, use of the terms “upstream” or “downstream” use the process direction as a reference, with the downstream direction being synonymous with the process direction and the upstream direction being opposite thereto. Further, use of the terms “lateral” or “lateral direction” are synonymous with the cross-process direction.

FIG. 1 is a schematic elevation view of a portion of a printing system 10. Printing system 10 includes a "marking engine." In the present embodiment, the marking engine is of an electrostatographic or xerographic type, and includes an image receptor in the form of drum photoreceptor 20, around which are disposed the familiar elements of xerographic printing for a single color or type of marking material, such as charge device 22, exposure device 24, development unit 26, substrate media transport 50, and cleaning device 30. Feeding into development unit 26 is a source 32 of marking material. The marking material may include toner, developer particles, etc., of a given type to place an image on the photoreceptor 20 according to the operation of exposure device 24. It should be noted that in this embodiment, the printing system 10 includes no fuser within its sheet path. Broadly speaking, the xerographic elements form a means for creating an image of marking material on the photoreceptor 20, but other technologies, such as various forms of ink-jet, may be used in alternative embodiments of the marking engine within printing system 10.

Further within printing system 10 is a structure that can be generally called a "transport" 50 for carrying substrate media in the form of a sheet through the portion of the sheet path corresponding to the printing system 10. The overall function of transport 50 includes receiving a sheet, moving it through the sheet path P to receive a toner image from the photoreceptor 20, and optionally making the sheet available for printing or further processing by a subsequent system in the sheet path P. In the embodiment shown, the transport 50 also has the function of bringing a sheet in contact with the photoreceptor 20. That portion of the sheet path P at and immediately adjacent to where the photoreceptor 20 contacts the sheet and/or transport 50 is referred to as the "transfer area." Further as shown, the transport 50 in this embodiment includes a single belt, extending the length of the portion of the sheet path P corresponding to the printing system 10. It should be understood that alternatively, the transport could include a belt that extends along more than one printing system 10. Also, the transport 50 could be one or more belts that overlap or extend across multiple printing systems 10 in a larger printing system assembly made up of a plurality of modular printing systems 10. While the illustrated embodiments are directed to a substrate media handling belt, is should be understood that the disclosed technologies can be applies to an intermediate transfer belt. Accordingly, detected movement in the intermediate transfer belt are dynamically adjusted for and the image is placed thereon for proper register when it is eventually transferred to a substrate media.

All of the printer hardware for a printing system 10 is supported by a frame 11, having the function of supporting at least the photoreceptor 20 and the transport 50. As shown, the frame 11 can be configured on the input or output side for use in conjunction with other printing systems sharing a common sheet path P. For example, printing system 10 could be a modular system coupled to one or more similar adjacent systems.

As shown in the FIG. 1 embodiment, there is further provided a sensing system that includes sensor groups 60, 61, disposed to detect the position and certain characteristics of a sheet being moved in printing system 10 and traveling on transport 50. Thus, the position and/or other characteristics of a sheet can be detected directly by sensing the sheet itself. Alternatively, the sensor groups 60, 61 can be used to track movement of the transport 50 to deduce how the sheet moves. Tracking or detecting belt movement is useful since individual sheets remain fairly well secured to the belt and thus the sheet movement generally corresponds well to the position of the belt. Thus, the position and/or other characteristics of a sheet can be detected indirectly by sensing at least a portion of the transport 50. Also, as a further alternative, a combination of individual sheet and/or belt sensors can be employed as part of a sensor group. Further, it should be understood that sensor groups 60, 61 need not be identical, so that the configuration and/or composition of individual sensors included in each group could be varied. The sensing system can have the capability, in terms of response time and image resolution, to detect positional and other anomalies of a sheet moved on transport 50, and output what can be called a "signal" or an "error signal" related to any anomaly. This error signal in turn can be used to influence exposure device 24. The sensing system can detect an edge, a particular small area or simply the presence of a passing sheet as it is moved by transport 50 through the transfer area. Similarly, the sensing system can be used to detect the position or speed of transport 50, by way of edge sensing or measuring some other portion of the transport 50. The sensor groups 60, 61 includes sensors disposed on opposed sides, in the process direction, of the marking engine and particularly the transfer area, with one group of sensors 60 on the upstream side and the other group of sensors 61 on the downstream side.

With sensor groups 60, 61 upstream and downstream of the transfer area, the sensing system can detect any movement and skew of the substrate media in or across the transfer zone. Because the image is written onto the photoreceptor 20 when the substrate media is upstream of the transfer area (i.e., some time before the image is directly transferred to the sheet), it is generally too late to use the sheet movement or misalignment information that occurred in the transfer area to correct image registration for that sheet. However, the detected sheet movement or misalignment information from the transfer area when repeatable can be used to properly register the image to subsequent substrate media. A comparison of information from the sensor groups 60, 61 will indicate movement or misalignment that occurs as the substrate media crosses the transfer area.

Additionally, although anomalies generated in the transfer area are difficult to correct with regard to the sheet being measured as it passes through the transfer area, some anomalies can be corrected for that sheet before it reaches the transfer area. The exposure device 24 generates a corresponding portion of an electrostatic latent image on the photoreceptor 20, in such a way that an anomaly detected at a given moment by sensor group 60 can be detected and compensated for shortly thereafter by exposure device 24. Thus, after the latent image is developed by development unit 26 and transferred to the print sheet at the transfer zone, the pre-existing printed image on the sheet and the corrected, newly-transferred image will "match," particularly in a color-separation registration sense.

In the illustrated embodiment, the various error signals output by sheet sensor groups 60, 61 within each printing system 10 are collected, compiled and/or processed by what is here called a "correction module," indicated as 70. The overall function of correction module 70, which incorporates both hardware and software (and can be part of a larger image-processing system which accepts partial image data to be printed by the printing system 10), is to take error signals relating to characteristics associated with the handled substrate media S, such as position, skew, movement or other abnormalities, and cause the marking engine to correct for them. Thus, the correction module 70 can influence the marking engine by adjusting and/or altering the behavior of a modulating laser or ionographic head in an electrostatographic marking device, or an ink-jet print-head in an ink-jet printing device. U.S. Pat. No. 6,137,517 to Furst et al. discloses an image registration adjustment system and method for dynamically compensating for photoreceptor belt or substrate skew. The methods and systems disclosed therein are incorporated herein by reference.

Hence, the detected characteristics of the substrate media can be indicated by a signal or signals from the sensor groups 60, 61 and stored in a table associated with correction module 70. Such a table can be used by the correction module 70 to alter or shift the image generated by the marking engine from a normal, initial or preliminary position on the photoreceptor to a position, orientation and/or scale/size that properly registers with the detected characteristic of the substrate media. Thus, the image generated on the photoreceptor is altered to anticipate or predict the detected repeating anomaly, whether it is cross-process movement, process-movement, skew or any combination thereof. Accordingly, the position, skew or even scale of the image is changed, such that the image placed on the photoreceptor is different than it would have been had the error not been detected. The alteration changes the location, orientation, scale or even distorts the image placement on the photoreceptor, in order to compensate for the detected sheet error. Also, certain repeating anomalies can be associated with other substrate media characteristics such as sheet size or thickness. In this way, certain anomalies are associated with a particular print job. Alternatively, the image could even be warped, if necessary, to correspond to detected characteristics of the target substrate media. In addition to one or more tables relating to detected movement in the transfer area, the correction module 70 can use further information such as sheet length, the gap or space between sheets moved by the transport 50 and whether a sheet is detected to be present down-stream or up-stream from the transfer area. With such additional information, the correction module 70 can account for dynamic shifting, warping, scaling and skewing of one or more portions of an image being written to the photoreceptor 20.

Figure 2:
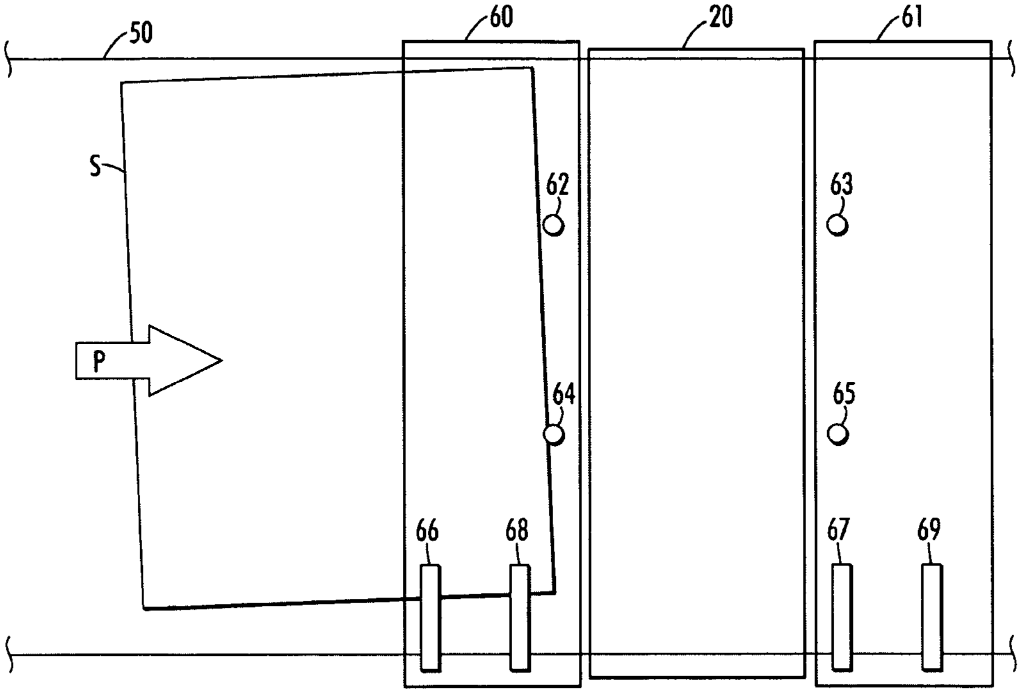
FIG. 2 is a plan view, in isolation, of one aspect of the dynamic image registration apparatus in accordance with aspects of the disclosed technologies.

FIG. 2 is a plan view of an exemplary sensor groups 60, 61 in conjunction with a portion of the marking engine. The sensors include point sensors 62-65 that can be used to detect the skew of the lead edge of the sheet S as well as to detect the process direction position P of the sheet as the sheet S moves on transport 50. The array sensors 66-69 are positioned to detect a lateral edge of the sheet S and/or a belt of the transport 50, as shown. These array sensors 66-69 can be used to detect the skew of an edge of the sheet S and to detect the position of the sheet S in the cross process direction. Thus the position of the sheet can be detected in three degrees of freedom; namely skew, process and cross process position. In this way, the associated correction module 70 for the particular module 10 can effectively shift the image to be printed in response to these positional anomalies. It should be understood that a fewer or greater number of sensors could be used in each sensor group 60, 61, limited only by the amount of information desired to be obtained by such sensors. Additionally, one or more further sensor groups could be provided. Also, in a modular system signals from multiple sensor groups 60, 61 across the modules can be used collectively. Further, the sensor groups 60, 61 can be positioned closer to or further from the transfer area than that shown in the illustrations. Positioning both sensor groups 60, 61 as close as possible to the transfer area can reflect more accurately movements occurring within or across the transfer area, but often this is limited by space and/or other components that normally reside in the same vicinity. A proximity of less than 100 mm of some sensors to the transfer area, but more particularly from 30 to 50 mm, will be sufficient. Accordingly, one embodiment places both sensor groups 60, 61 immediately adjacent the transfer area. Both sensor groups 60, 61 can be substantially equidistant from the transfer area, as shown in FIG. 1.

Further, in some embodiments, the sensing system through its sensor groups 60, 61 can detect the size of an incoming sheet (or, with suitable sensors, an image on the sheet), and the correction module 70 can take that information to influence the marking engine to change a size and/or aspect ratio of the image to be printed by the module 10; this ability to make magnification corrections, thereby making the image larger or smaller, is useful in situations where it is possible that a single print sheet may change in size (such as caused by changes in temperature or moisture content) in the course of the printing process.

It should be appreciated that any sensing systems that can detect the position of incoming media could be used in the present invention and that the present invention is in no way limited to the use of the sensing system shown in this example. A related system is described in USPTO Ser. No. 12/262,803, filed Oct. 31, 2008, entitled Method Of And System For Module To Module Skew Alignment, cited above.

Figure 3:
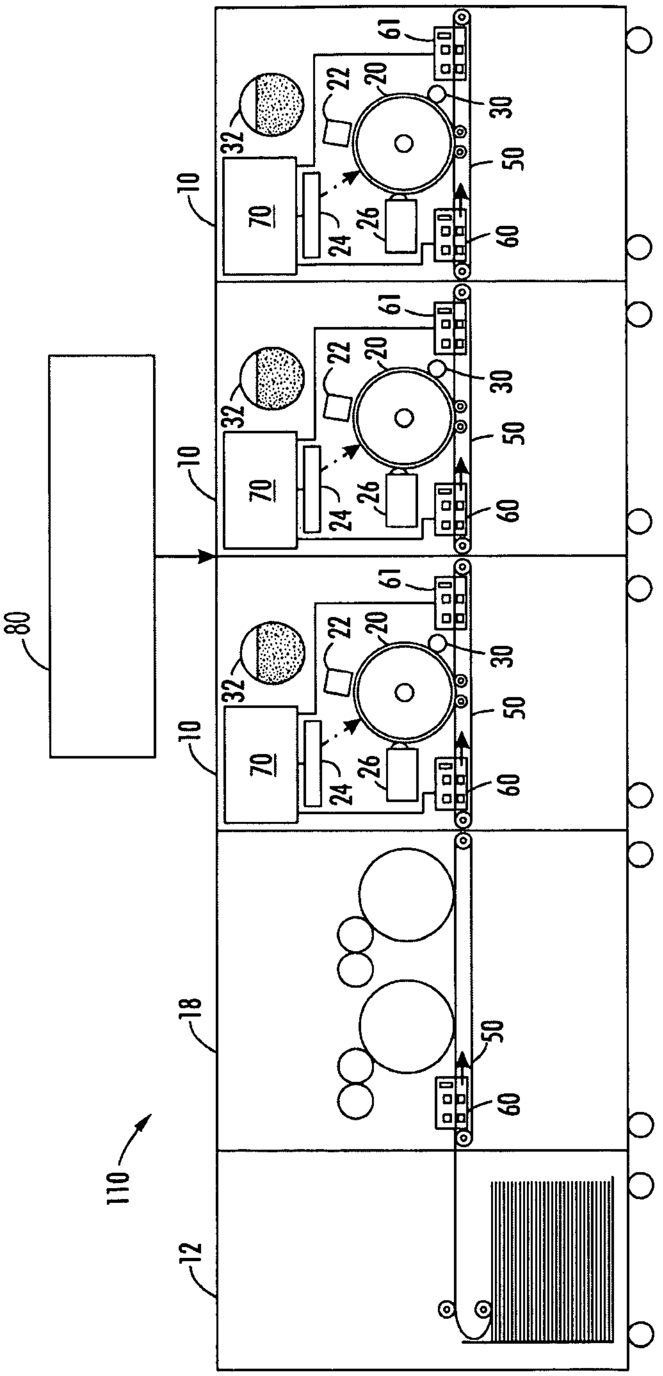
FIG. 3 is a schematic view of a modular assembly of printing systems, including a plurality of dynamic image registration apparatus in accordance with aspects of the disclosed technologies.

FIG. 3 is a schematic view of a modular printing assembly 110 of printing systems, including a plurality of dynamic image registration printing system 10. In possible implementations, a central processor 80 is provided, for governing and coordinating a plurality of printing systems 10. The central processor 80 can interact and coordinate individual correction modules 70 within each printing system 10. In other words, correction of positional or magnification anomalies among a series of modules along a print path can be divided between the correction module 70 associated with each printing system 10 and the central processor 80 controlling the marking engines across the print path of those modules. In one implementation, anomalies within a predetermined spatial range (smaller than, for example, 0.5 mm) can be corrected internally within each printing system 10, while larger or cumulative spatial anomalies are effectively referred to central processor 80, such as for more systemic correction and/or notifying the human user. An example of systemic correction, for any purpose, would include having a marking engine in an upstream printing system 10 along the sheet path shift or alter the images it produces in response to a positional anomaly detected in a downstream printing system 10, as opposed to or in addition to a single printing system 10 making the correction in response to a detected anomaly and performing a correction entirely apart from the other printing systems 10. Another arrangement could provide for the central processor 80 detecting recurrent patterns of positional errors as individual modules are used, and determining a course of action.

Although the illustrated embodiments relate to so-called "digital" printing systems, in that the marking engine, whether electrostatographic, ink-jet, or some other printing technology, ultimately relies on input image data in digital form, certain of the print modules 18 in a larger system may use analog or fixed-image systems, such as offset or flexographic printing. For instance, if it is desired to print a magazine in which only portions of the image data, such as a mailing address, are variable from print to print, and the rest comprising the same partial image for every print, only a subset of all of the modules forming the sheet path need be responsive to digital image data. The non-digital modules 18 could use another technology, such as offset or flexographic.

FIG. 3 shows a modular printing assembly 110, that includes a so-called analog or non-digital (such as offset or flexographic, as those terms are broadly understood in the art of printing) module 18, which work in series with printing systems 10. Alternatively, other types of module could be incorporated into such a modular assembly. Even modules using non-digital technology could be designed to be somewhat responsive to image correction based on anomalies detected by a sensing system, e.g., a module using a flexographic system could be designed to adjust placement of the image in a process direction (by adjusting the rotational position of an image roll between prints) or cross-process direction (by moving the roll longitudinally) substantially in real time as print sheets are accepted by such a module. Even a non-digital module such as 18 can include sensing systems 60, 61 as described above, for detecting the position of a sheet in one or more transfer areas. Any error signal therefrom can be relayed to a central processor 80, for helping controlling the an entire modular printing assembly 110.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims, as originally presented and as they may be amended, encompass variations, alternatives, modifications, improvements, equivalents, and substantial equivalents of the embodiments and teachings disclosed herein, including other marking technologies such ink jet printing and those that are presently unforeseen or unappreciated, and that, for example, may arise from applicants/patentees and others.

What is claimed is:

1. A printing apparatus for dynamically registering an image relative to a target substrate media being moved substantially in a process direction along a substrate media path, the apparatus comprising:

a marking engine for generating the image for transfer to the target substrate media;

a transport for moving the target substrate media along the substrate media path in the process direction to receive the image in a transfer area from the marking engine;

a sensing system for detecting, along the substrate media path, a characteristic of at least one other substrate media moved previously by the transport; wherein the sensing system includes at least one of a sheet edge sensor, a point sensor and an array sensor used in detecting the characteristic;

a correction module for altering the image generated by the marking engine based on signals from the sensing system related to the characteristic, wherein the characteristic is detected from at least two portions of the substrate media path, the two portions disposed on opposed sides of the transfer area in the process direction; and wherein the signals indicate a process direction movement, a cross-process direction movement, a skew of the at least one other substrate media relative to the substrate media path, and a size of the substrate media.

2. The apparatus of claim 1, wherein the altered image corresponds to a shift of the at least one other substrate media in at least one of a process direction, a cross process direction and a skew.

3. The apparatus of claim 1, wherein the sensing system includes at least one sensor disposed on each of the opposed sides of the transfer area.

4. The apparatus of claim 1, wherein the characteristic is detected at least one of directly by sensing the substrate media and indirectly by sensing at least a portion of the transport.

5. The apparatus of claim 1, wherein the at least one other substrate media includes a plurality of other substrate media.

6. The apparatus of claim 1, wherein the correction module alters the image generated based on at least one of a dimension of the target substrate media, a spacing between a plurality of the other substrate media, and the presence of at least one other substrate media at least one of ahead of or behind the target substrate media in the process direction.

7. The apparatus of claim 1, further comprising:

a supply of marking material, wherein the image generated by the marking engine is formed of marking material.

8. The apparatus of claim 1, wherein the marking engine includes an electrostatographic image receptor, the image receptor engaging the substrate media in the transfer area to transfer a marking material.

9. The apparatus of claim 1, wherein the correction module causes the marking engine to change magnification of the image generated by the correction module.

10. A method of dynamically registering an image relative to a target substrate media in a printing system, the target substrate media moving substantially in a process direction within the printing system along a substrate media path, the method comprising:

detecting a characteristic of a trial substrate media crossing, along the substrate media path, a transfer area of a marking engine in the printing system, the transfer area including a region in which an image is transferred from a marking engine to a substrate media, the characteristic being detected from opposed sides of the transfer area relative to the process direction;

shifting an image generated by the marking engine based on the detected characteristic;

transferring the shifted image to a target substrate media; and wherein the detected characteristic indicates a process direction movement, a cross-process direction movement, a skew of the trial substrate media relative to the substrate media path; and the size of the target substrate media.

11. A method of dynamically registering an image relative to a target substrate media of claim 10, wherein the shifted image corresponds to a shift of the trial substrate media in at least one of a process direction, a cross process direction and a skew.

12. A method of dynamically registering an image relative to a target substrate media of claim 10, wherein the characteristic is detected by a sensing system that includes at least one of a sheet edge sensor, a point sensor and an array sensor for detecting an edge of the trial substrate media.

13. A method of dynamically registering an image relative to a target substrate media of claim 10, wherein the trial substrate media includes a plurality of trial substrate media.

14. A method of dynamically registering an image relative to a target substrate media of claim 11, wherein the image is shifted by a correction module that alters the image generated based on at least one of a dimension of the target substrate media, a spacing between a plurality of the other substrate media, and the presence of at least one other substrate media at least one of ahead of or behind the target substrate media in the process direction.

15. A method of dynamically registering an image relative to a target substrate media of claim 14, wherein the correction module causes the marking engine to change magnification of the image generated by the correction module.

16. A method of dynamically registering an image relative to a target substrate media of claim 10, wherein the marking engine includes an electrostatographic image receptor, the image receptor engaging the substrate media in the transfer area to transfer a marking material.

* * * * *